No. 824,399. PATENTED JUNE 26, 1906.
C. E. AUSTIN.
MILK AND CREAM VEHICLE.
APPLICATION FILED JUNE 12, 1905.
2 SHEETS—SHEET 2.
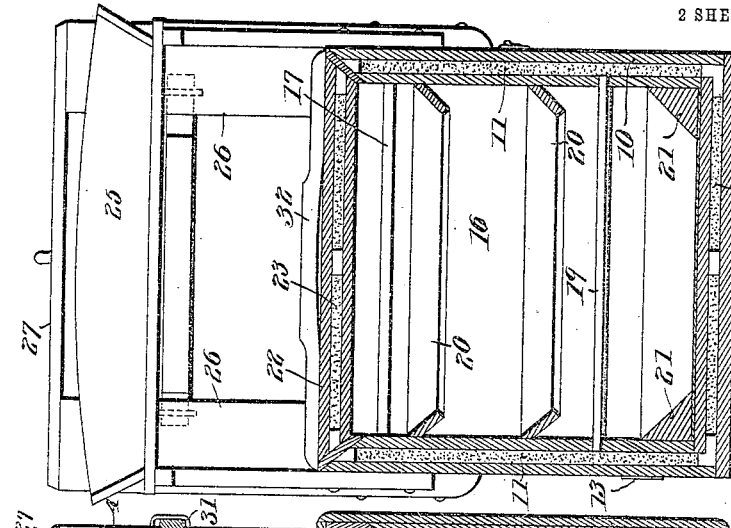
Witnesses
E. J. Stewart
E. N. Woodward
Clarence E. Austin, Inventor.
by
Attorneys

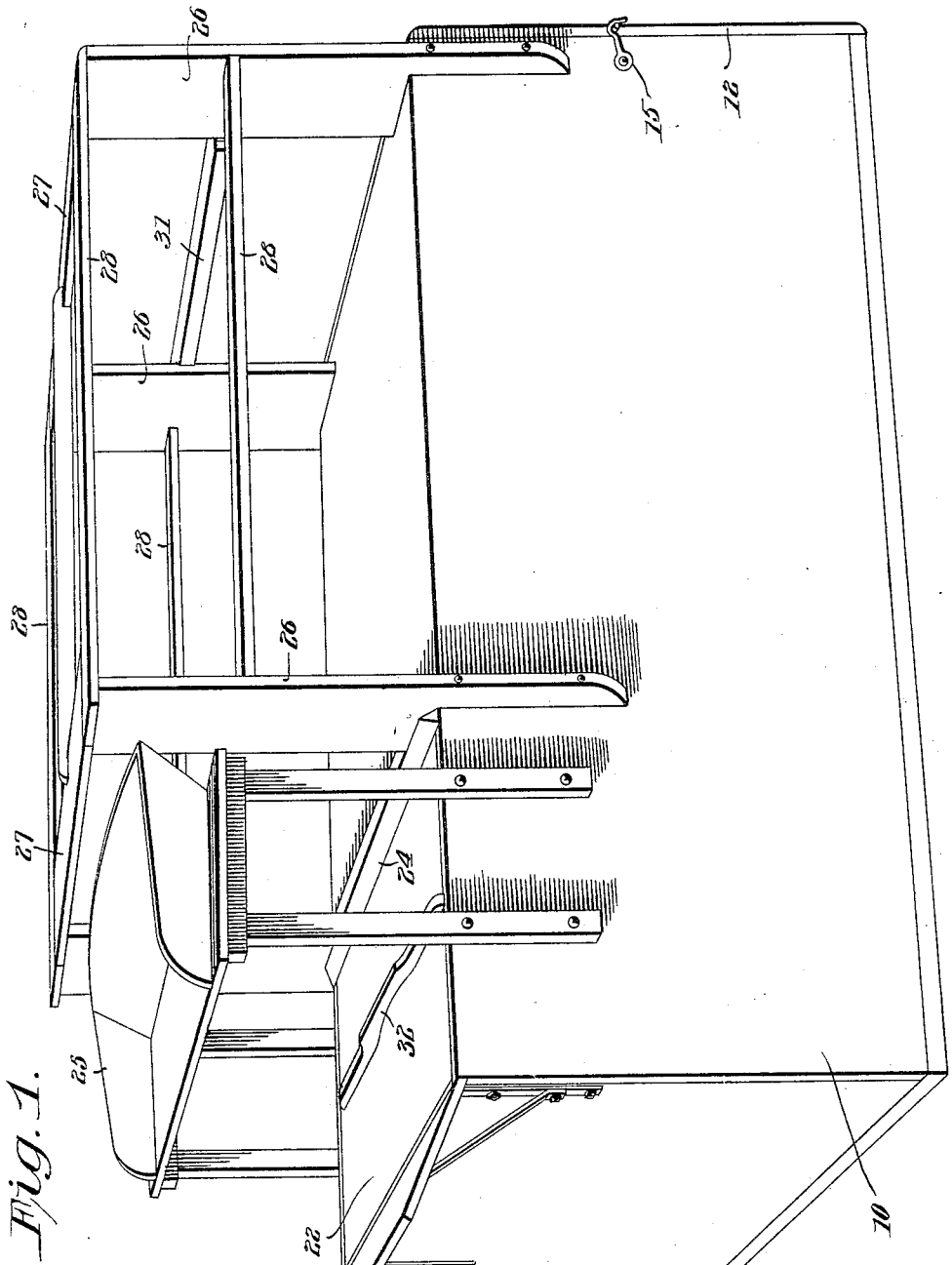

UNITED STATES PATENT OFFICE.

CLARENCE E. AUSTIN, OF MARCUS, IOWA.

MILK AND CREAM VEHICLE.

No. 824,399.  Specification of Letters Patent.  Patented June 26, 1906.

Application filed June 12, 1905. Serial No. 264,922.

*To all whom it may concern:*

Be it known that I, CLARENCE E. AUSTIN, a citizen of the United States, residing at Marcus, in the county of Cherokee and State of Iowa, have invented a new and useful Milk and Cream Vehicle, of which the following is a specification.

This invention relates to vehicles for the transportation of milk and cream and similar perishable products, and has for its object to provide a simply-constructed and conveniently-arranged apparatus in which the products are preserved from deterioration during transportation.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the body portion of the vehicle with the improvements embodied therein. Fig. 2 is a longitudinal sectional elevation. Fig. 3 is a transverse section on the line 3 3 of Fig. 2. Fig. 4 is a plan view of a portion of the device on the line 4 4 of Fig. 2.

In the improved device is comprised a casing 10 of any required size or form, but preferably of about the size and form for mounting upon an ordinary vehicle running-gear, the latter not being shown, as it forms no part of the present invention. The walls of the body are hollow and filled with suitable non-heat-conducting material, as at 11, and with a door 12, hinged at 13 to the rear and provided with non-conducting filling, as at 14, and with a suitable holding-catch, as at 15.

The interior of the body portion is divided by a transverse partition 16 into two compartments of unequal size, the smaller compartment for receiving ice and the larger compartment for the products to be transported. The partition 16 extends from side to side of the casing 10, but does not extend either to the top or bottom of the same and is continued rearwardly by a longitudinal member 17, which terminates near the rear door 12 and leaving a passage at 18, as shown in Fig. 2.

The ice-compartment is provided with spaced ice-supporting bars 19, disposed above the bottom of the casing and also provided with guard members 20 for preventing the ice from contacting directly with the walls of the compartment, and guard-ribs 21 are also disposed upon the bottom of the casing beneath the ice-compartment to prevent small pieces of ice which may fall between the bars 19 from passing into the larger compartment. The guard members 20 being arranged upon all sides of the inner walls of the ice-chamber and being also inclined inwardly and downwardly offer no resistance to the insertion of the ice into the chamber, while at the same time hold the ice away from the walls and prevent direct contact therewith or injury thereby. The receptacle formed by the ribs 21 is an important feature of the invention, as any small particles of ice which may be broken off by the swaying of the vehicle will be caught in the receptacle and prevented from passing into the larger chamber.

The upper wall of the casing above the ice-compartment is formed with an aperture through which the ice is supplied, and this aperture is provided with a closure 22, having a filling of non-conductive material, as at 23. The "seats" for the door 14 and ice-compartment closure 22 are beveled to increase the air-resisting qualities, and a transverse strip 24 is secured upon the casing 10 and extending over the rear edge of the closure to assist in holding it in place.

Disposed above the ice-compartment is a seat 25 for the driver, the feet of the driver thus bearing upon the forward portion of the closure and holding it in place.

Rising from the casing 10 rearwardly of the seat 25 are vertical members 26, connected by transverse members 27 and longitudinal members 28, the whole forming a rack above the casing for holding egg-crates, empty milk or cream cans, or other articles which are not required to be carried within the casing proper. The rear vertical members are provided with keepers 29 30 for detachably supporting a guard-bar 31 to hold the articles within the rack. The closure 22 is provided with a handle 32 for assisting in handling the same, and the casing 10 is provided with a drainage-tube 33 to carry off the water resultant from the melting ice. The casing 10 will preferably be lined with zinc or other similar sheet metal. By this arrangement it will be obvious that when the smaller compartment is supplied with ice the cooling of the air will cause downward currents, which filling the lower portion of the larger compartment displaces the warmer air, which rises and passes through the aperture 18 and then forwardly above the longitudinal member 17 and into the ice-chamber and in contact with the ice therein and thereby cooled and caused to descend and pass again to the larger compartment, and so on continuously, and producing a constant and rapid circulation and equalizing the temperature throughout the whole casing and producing the requisite refrigeration and with the consumption of a comparatively small amount of ice. The ice-supporting bars 19 being spaced above the bottom of the casing for a considerable distance, a relatively large area is provided beneath the ice for the free circulation of the air, and thereby accelerating the action of the currents and increasing the efficiency of the apparatus.

It will be noted that the ice-compartment can be replenished without decreasing the temperature in the larger compartment, as the opening of the closure 22 will not permit the escape of any of the cold air, as the latter is always at the bottom and will not be materially affected by opening the closure 22 for the short period of time necessary to resupply the ice-chamber.

The device will be found very useful to farmers, milkmen, and others in gathering milk and cream for creameries, or for the supply of the trade, or to retail customers, as may be required.

Having thus described the invention, what is claimed is—

A refrigerator wagon-body comprising a casing having an ice-receiving compartment therein, said compartment provided with an inlet-opening at the top thereof, a closure for the ice-compartment and supported within the opening and flush with the top of the casing, a handle secured upon the closure, and a driver's seat extending over the handle and a portion of the closure, that portion of the closure in front of the handle and driver's seat constituting a rest for, and adapted to be held closed by, the feet of the driver.

In testimony that I claim the foregoing as my own I have hereto affixed my signature in the presence of two witnesses.

CLARENCE E. AUSTIN.

Witnesses:
　E. F. JULIAN,
　EDWIN D. AUSTIN.